US012344756B2

(12) United States Patent
Saito et al.

(10) Patent No.: US 12,344,756 B2
(45) Date of Patent: Jul. 1, 2025

(54) LIQUID COMPOSITION, METHOD OF APPLYING LIQUID, DEVICE FOR APPLYING LIQUID, PRE-PROCESSING FLUID, AND SET OF PRE-PROCESSING FLUID AND INK

(71) Applicants: Shun Saito, Kanagawa (JP); Kento Sugita, Tokyo (JP); Koichiro Oyama, Kanagawa (JP); Mizuki Kuroha, Kanagawa (JP); Satoshi Takahashi, Kanagawa (JP); Yuuki Yokohama, Kanagawa (JP); Takashi Watanabe, Tokyo (JP)

(72) Inventors: Shun Saito, Kanagawa (JP); Kento Sugita, Tokyo (JP); Koichiro Oyama, Kanagawa (JP); Mizuki Kuroha, Kanagawa (JP); Satoshi Takahashi, Kanagawa (JP); Yuuki Yokohama, Kanagawa (JP); Takashi Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 736 days.

(21) Appl. No.: 17/649,111

(22) Filed: Jan. 27, 2022

(65) Prior Publication Data

US 2022/0251409 A1 Aug. 11, 2022

(30) Foreign Application Priority Data

Feb. 2, 2021 (JP) ................................. 2021-015122
Dec. 2, 2021 (JP) ................................. 2021-195894

(51) Int. Cl.
*C09D 11/54* (2014.01)
*A01N 55/02* (2006.01)
*C09D 11/033* (2014.01)
*C09D 11/102* (2014.01)
*C09D 11/38* (2014.01)
*C09D 11/40* (2014.01)

(52) U.S. Cl.
CPC .............. *C09D 11/54* (2013.01); *A01N 55/02* (2013.01); *C09D 11/033* (2013.01); *C09D 11/102* (2013.01); *C09D 11/38* (2013.01); *C09D 11/40* (2013.01)

(58) Field of Classification Search
CPC .......... C09D 11/54; C09D 11/40; C09D 5/14; C09D 11/102; A01N 55/02
See application file for complete search history.

(56) References Cited

U.S. PATENT DOCUMENTS

| | | | |
|---|---|---|---|
| 2015/0174920 A1 | 6/2015 | Namba et al. | |
| 2018/0094152 A1 | 4/2018 | Sakaguchi et al. | |
| 2018/0126728 A1* | 5/2018 | Saito ......................... | B41J 2/14 |
| 2018/0244935 A1 | 8/2018 | Sakaguchi et al. | |
| 2020/0238731 A1 | 7/2020 | Saito et al. | |

FOREIGN PATENT DOCUMENTS

| | | | | |
|---|---|---|---|---|
| DE | 102011003685 A1 * | 8/2012 | ............. | A01N 59/16 |
| JP | 9-003799 | 1/1997 | | |
| JP | 10-231201 | 9/1998 | | |
| JP | 2006008588 A * | 1/2006 | | |
| JP | 2008037911 A * | 2/2008 | ............. | G01N 33/53 |
| JP | 2013-244601 | 12/2013 | | |
| JP | 2015-134493 | 7/2015 | | |

OTHER PUBLICATIONS

DE102011003685A1_English (Year: None).*
JP2006008588A_English (Year: None).*
JP2008037911A_English (Year: None).*

* cited by examiner

*Primary Examiner* — Randy P Gulakowski
*Assistant Examiner* — Holley Grace Hester
(74) *Attorney, Agent, or Firm* — Grüneberg and Myers PLLC

(57) ABSTRACT

A liquid composition contains a macrocyclic compound enclosing a metal ion, water, and an organic solvent, wherein a recording medium where the liquid composition has been applied has at least one of an antibacterial activity or an antiviral activity.

15 Claims, 1 Drawing Sheet

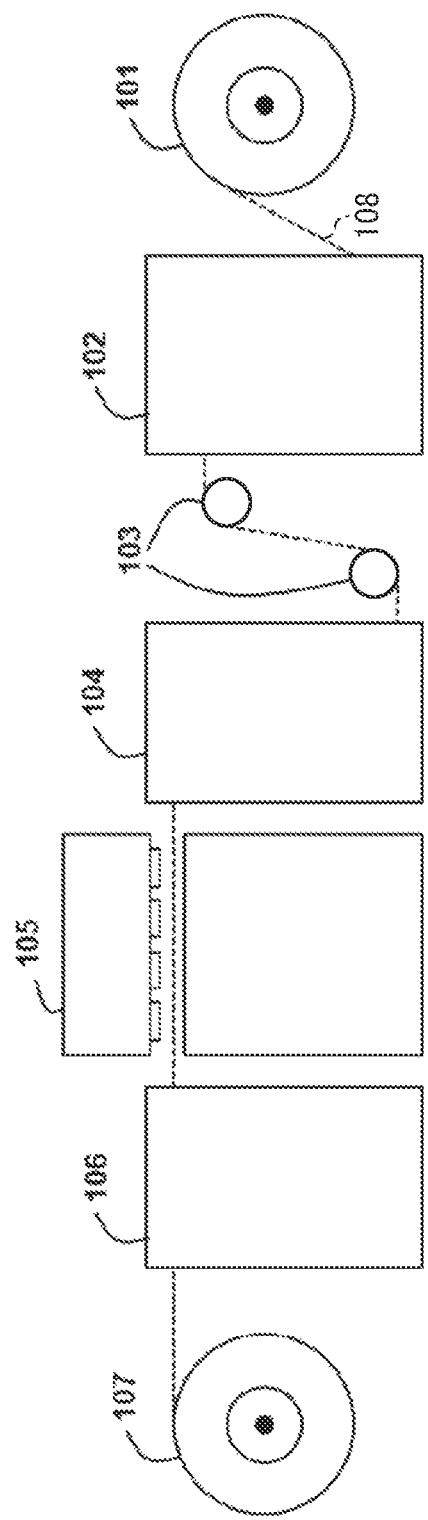

LIQUID COMPOSITION, METHOD OF APPLYING LIQUID, DEVICE FOR APPLYING LIQUID, PRE-PROCESSING FLUID, AND SET OF PRE-PROCESSING FLUID AND INK

CROSS-REFERENCE TO RELATED APPLICATIONS

This patent application is based on and claims priority pursuant to 35 U.S.C. § 119 to Japanese Patent Application Nos. 2021-015122 and 2021-195894, filed on Feb. 2, 2021 and Dec. 2, 2021, respectively, in the Japan Patent Office, the entire disclosures of which are hereby incorporated by reference herein.

BACKGROUND

Technical Field

The present disclosure is related to a liquid composition, a method of applying liquid, a device for applying liquid, and pre-processing fluid, and a set of a pre-processing fluid and ink.

Description of the Related Art

Since inkjet printing devices are relatively quiet, have low running costs, and are capable of printing color images with ease, they are now widely used at home to output digital information. Inkjet technologies have been appealing in commercial and industrial as well as home settings.

Ink and pre-processing fluid are used as liquid compositions for use in printing by an inkjet printing device. The pre-processing fluid is applied to a recording medium before the ink is applied thereto. These liquid compositions contain a preservative and fungicide so as to enhance corrosion proof and mildew-proof.

SUMMARY

According to embodiments of the present disclosure, a liquid composition is provided which contains a macrocyclic compound enclosing a metal ion, water, and an organic solvent, wherein a recording medium w % here the liquid composition has been applied has at least one of an antibacterial activity or an antiviral activity.

BRIEF DESCRIPTION OF THE DRAWING

A more complete appreciation of the disclosure and many of the attendant advantages and features thereof can be readily obtained and understood from the following detailed description with reference to the accompanying drawing, wherein:

FIGURE is a diagram of illustrating a device for applying a liquid composition and ink to a continuous recording medium.

The accompanying drawing is intended to depict example embodiments of the present invention and should not be interpreted to limit the scope thereof. The accompanying drawing is not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Organic preservatives and fungicides are likely to be decomposed when a recording medium is heated for drying during printing. This decomposition makes it difficult to impart at least one of antibacterial activity and antiviral activity to the recording medium or recorded matter after printing. On the other hand, inorganic preservatives and fungicides cause a problem of storage stability by precipitation in a liquid composition. They also have an adverse impact on the quality of recorded matter because they color a liquid composition.

According to the present disclosure, a liquid composition is provided which has excellent storage stability, imparts at least one of antibacterial activity and antiviral activity to recorded matter, and minimizes coloring of recorded matter.

Next, an embodiment of the present disclosure is described.

Liquid Composition

The liquid composition of the present disclosure contains a macrocyclic compound, water, an organic solvent, and optional components including additives such as a cationic polymer and surfactant. The macrocyclic compound encloses a metal ion derived from a metal salt; in other words, the metal ion is contained in a liquid composition to form a metal complex.

'Enclosing' means that one molecule or compound is contained or housed in a basket, layer, or tunnel-like void another molecule or compound forms.

The liquid composition applied to a recording medium imparts either or both of antibacterial activity and antiviral activity to the region of the recording medium where the liquid composition has been applied. In other words, a recording medium where the liquid composition has been applied has either or both of an antibacterial activity and an antiviral activity.

Hereinafter, the activities of antibacterial activity and antiviral activity are generally referred to as anti-pathogen activity. Pathogen generally causes a disease to a living object as a host. In the present disclosure, it means a concept including germs such as bacteria and virus regardless of whether they cause a disease.

Antibacterial activity means a property of reducing the number of bacteria by damaging or annihilating them upon contact between the bacteria and the region of a recording medium where a liquid composition has been applied.

Reducing the number of bacteria means the number of bacteria in the region of a recording medium where the liquid composition has been applied decreases over time in comparison with the number of bacteria in the region of the recording medium free of the liquid composition. The method of evaluating this antibacterial activity is not particularly limited. The method according to JIS L 1902:2015 format or ISO 20743:2013 regulation regarding the antibacterial property of fiber products and the method according to JIS Z 2801:2012 format or ISO 22196:2007 regulation regarding the antibacterial property of the surface of non-fiber products such as plastic and metal are preferably used for testing the antibacterial activity. The testing method is selected depending on the type of a recording medium where a liquid composition is applied.

The antibacterial activity value of a liquid composition is preferably 1.0 or greater, more preferably 1.5 or greater, and 2.0 or greater obtained by a method according to JIS L 1902:2015 format or JIS Z 2801:2012 format to determine whether the liquid composition has antibacterial activity.

Antiviral activity means features of reducing the number of viruses by damaging or annihilating them or minimizing the activity such as infection ability and proliferation in a host as entire virus upon contact between the virus and the region of the recording medium where the liquid composition has been applied. Reducing the number of viruses or minimizing the activity as the entire virus means that the number of viruses or the activity of the entire virus in the region of a recording medium where the liquid composition has been applied decreases over time in comparison with the number of viruses or the activity of the entire virus in the region of the recording medium free of the liquid composition. The method of evaluating this antiviral activity is not particularly limited. The method according to JIS L 1922:2016 format or ISO 18184:2014 regulation regarding the antiviral property of fiber products and the method according to ISO 21702:2019 regulation regarding the antiviral property of the surface of non-fiber products such as plastic and metal are preferably used for testing the antiviral activity. The testing method is selected depending on the type of a recording medium where a liquid composition is applied.

The antiviral activity value of a liquid composition is preferably 1.0 or greater, more preferably 1.5 or greater, and 2.0 or greater obtained by a method according to JIS L 1922:2016 format, ISO 18184:2014 regulation, or ISO 21702:2019 regulation to determine whether the liquid composition has antiviral activity.

Bacteria include prokaryotes, archaea, and eukaryotes. Prokaryotes include gram-negative, gram-positive, *Staphylococcus aureus, E. coli, Bacillus pestis*, viblio *cholerae*, Mycrobacterium tuberculosis, *Pseudomonas aeruginosa*, spiroheta that causes syphilis and lime disease, ricketchia that causes epidemic typhus and scrub typhus, *chlamydia, mycoplasma*, and cyanobacteria. Archaea includes methanogen and hyperthermophiles. Eukarvotes includes fungi, mushrooms, yeast *candida*, psoriasis, and malaria parasite that causes malaria.

The bacteria in the present disclosure are not limited to those identified now but include those found in the future. A specific example of bacteria to be found in the future is an antimicrobial resistant bacteria such as methicillin-resistant *Staphylococcus aureus* (MRSA). Such bacteria will be newly identified and named.

Virus is an infectious ultramicro structure that copies itself utilizing cells of other live forms. It includes DNA virus such as herpes virus, pox virus, and hepadona virus, and RNA virus such as flavi virus, toga virus, corona virus, hepatitis D virus, orthomyxo virus, paramyxo virus, rhabdo virus, bunya virus, filo virus, and retro virus.

Orthomyxo virus includes influenza virus A, influenza virus B, influenza virus C, infectious salmon anemia (ISA) virus, thogoto virus, and quaranja virus.

Corona virus includes alpha corona virus, beta corona virus, gamma corona virus, and delta corona virus.

Paramyxo virus includes paramyxo virus, *rubra* virus, morbilli virus, and pneumo virus.

The virus in the present disclosure is not limited to those identified now but includes those to be found in the future. A specific example of the virus to be found in the future is a variant virus. Such virus will be newly identified and named.

Metal Salt

The liquid composition is manufactured using a metal salt as a material and contains a metal ion derived from a metal salt in a form of metal complex. The liquid composition contains a macrocyclic compound enclosing a metal salt derived from a metal salt, which is described later. The metal ion contained in a liquid composition imparts anti-pathogen activity to the liquid composition and the region of a recording medium where the liquid composition has been applied.

The reason of using a metal ion derived from a metal salt as a material for imparting an anti-pathogen activity to a liquid composition is as follows.

Since liquid such as ink, pre-processing fluid, and post-processing fluid is applied to a recording medium for visualizing information by images and text, the liquid applied to the recording medium is heated for drying. If the liquid contains an organic preservative and fungicide, such an agent is decomposed quickly. Therefore, recorded matter, which is a recording medium obtained after printing, cannot have an anti-pathogen activity. On the other hand, this heating impact on recorded matter can be minimized in the present disclosure because of the metal ion. The recorded matter can thus have an anti-pathogen activity.

The metal is not particularly limited as long as it can impart an anti-pathogen activity to the region of a recording medium where a liquid composition has been applied. Specific examples include, but are not limited to, ions of aluminum, barium, calcium, copper, iron, silver, manganese, nickel, tin, titanium, and zinc. Of these, calcium, magnesium, or aluminum ion is preferable to achieve good storage stability of a liquid composition. Copper or silver ion is preferable to impart a high level of anti-pathogen activity. Since the liquid composition of the present disclosure is applied to a recording medium, silver ion is more preferable and advantageous because it has low coloring ability, thereby less affecting the quality of recorded matter.

There is no specific limit to the selection of the counter ion of the metal ion of a metal salt. Specific examples include, but are not limited to, inorganic acid ions such as chloride ion, ionide ion, sulfuric acid ion, nitric acid ion, phsophoric acid ion, and thiocyanic acid ion, and organic acid ions such as acetic acid ion, oxalic acid ion, lactic acid ion, fumaric acid ion, citric acid ion, salicylic acid ion, and benzoic acid ion. Of these, nitric acid ion is preferable to enhance the storage stability of a liquid composition. It is not preferable to use ionide ion or salicylic acid ion because it may color the a liquid composition depending on a combination. However, these metal ions are not excluded because they can be used depending on a combination with other components.

The metal salt is not particularly limited. Specific examples include, but are not limited to, calcium chloride, magnesium sulfate, aluminum chloride, copper chloride, and silver nitrate. Of these, copper chloride and silver nitrate are preferable. Silver nitrate is more preferable.

The proportion of the metal salt to a liquid composition is preferably from 1 to 10 percent by mass and more preferably from 1.5 to 5 percent by mass. A proportion of the metal salt of from 1 percent by mass or greater enhances the anti-pathogen activity of a recording medium. A proportion of the metal salt of 10 percent by mass or less enhances the storage stability of a liquid composition.

As described above, the liquid composition of the present disclosure may contain a typical organic antibacterial or antiviral agent because the metal salt in the liquid composition imparts the anti-pathogen activity to the liquid composition and the region of a recording medium where the liquid composition has been applied; it is, however, preferable to substantially exclude such an organic agent. 'Substantially exclude such an organic agent' means that no such typical organic antibacterial or antiviral agent is detected as a liquid composition is analyzed by a known method of a common general technical knowledge in an art.

Macrocyclic Compound

The liquid composition contains a macrocyclic compound enclosing the metal ion described above. The macrocyclic compound in the present disclosure has a cyclic structure and forms a complex by coordinating a metal ion. The macrocyclic compound has a ten-membered ring, twelve-membered ring, eighteen-membered ring, or higher number-membered ring.

The macrocyclic compound has a pair of isolated electrons of a hydrophilic group or oxygen atom inside the ring or the molecule forming the ring. The outside the ring preferably has affinity to an organic solvent. Since the metal ion is enclosed in a macrocyclic compound, it does not precipitate even in the presence of an acid, alkali, or anion so that the storage stability of the liquid composition is prevented from deteriorating. Since the liquid composition of the present disclosure is applied to a recording medium, a metal salt having a high level of coloring ability such as copper chloride may have a great impact on the quality of recorded matter. However, this coloring ability is lowered by the combinational use with a macrocyclic compound.

The macrocyclic compound is not particularly limited as long as it can enclose a metal ion. Specific examples include, but are not limited to, crown ether, cryptand, calixarene, cyclic polyamine, and their derivatives. Of these, crown ether, cryptand, and their derivatives are preferable to effectively enclose a small particle such as a metal ion.

Specific examples of crown ether include, but are not limited to, 1,2-crown-4-ether, 15-crown-5-ether, 18-crown-6-ether, dibenzo-18-crown-6-ether, tribenzo-18-crown-6-ether, and diaza-18-crown-6-ether.

Specific examples of cryptand include, but are not limited to, [2,2,2] cryptand, [2,2,1] cryptand, [2,1,1] cryptand, and [3,3,2] cryptand.

The molecular weight of a macrocyclic compound is not particularly limited as long as the compound can enclose a metal ion. It is preferably from 250 to 500 to enhance the storage stability of a liquid composition.

The proportion of the macrocyclic compound to a liquid composition is preferably from 1 to 20 percent by mass and more preferably from 3 to 10 percent by mass. A proportion of the macrocyclic compound of from 1 to 20 percent by mass or less enhances the storage stability of a liquid composition.

The mass of the macrocyclic compound in a liquid composition is preferably greater than that of the metal salt. Under this condition, the storage stability of a liquid composition is enhanced.

Whether a liquid composition contains a macrocyclic compound enclosing a metal ion can be analyzed by liquid chromatograph-mass spectrometer (LC-MS)

Water

The liquid composition contains water. The proportion of water in a liquid composition is not particularly limited and can be suitably selected to suit to a particular application. In terms of the drying and other properties of a liquid composition, the proportion is preferably from 10 to 95 percent by mass and more preferably from 20 to 90 percent by mass of the entire liquid composition.

Organic Solvent

The liquid composition contains an organic solvent. The organic solvent is not particularly limited and water-soluble organic solvents can be used. It includes, but is not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples of the water-soluble organic solvent include, but are not limited to: polyhydric alcohols such as ethylene glycol, diethylene glycol, 1,2-propanediol, 1,ita3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, triethylene glycol, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide. N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyhydric alcohol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether and polyhydric alcohol arylethers such as ethylene glycol monophenylether and ethylene glycol monobenzylether.

The proportion of the organic solvent is not particularly limited and can be suitably selected to suit to a particular application. In terms of the drying property of a liquid composition, the proportion in the entire liquid composition is preferably from 5 to 50 percent by mass, more preferably from 5 to 40 percent by mass, furthermore preferably from 5 to 30 percent by mass, and particularly preferably from 50 to 20 percent by mass.

Cationic Polymer

The liquid composition optionally and preferably contains a cationic polymer. A liquid composition containing a cationic polymer can further impart an anti-pathogen activity to the region of a recording medium where the liquid composition has been applied.

The cationic polymer is not particularly limited and can be suitably selected to suit to a particular application. An example is a cationic polymer obtained by polymerizing an amine and a monomer containing epihalohydrin.

Specific examples of the cationic polymer include, but are not limited to, a polyamine-epihalohydrin copolymer, a polyamide-epihalohydrin copolymer, a polyamide polyamine-epihalohydrin copolymer, and an amine-epihalohydrin copolymer. Of these, the copolymer represented by the Chemical Formula I below, the copolymer represented by the Chemical Formula II below, and the copolymer obtained by polymerizing an amine monomer, a monomer represented by the Chemical Formula III, and a monomer represented by the Chemical Formula IV are preferable. It is suitable to use a quaternary ammonium salt type and a water-dispersible type as the cationic polymer.

Chemical Formula I

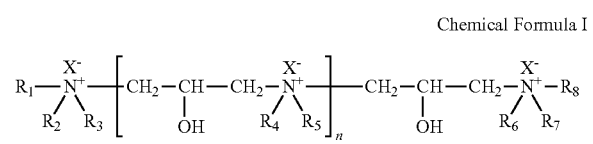

In the Chemical Formula I, $R_1$ to $R_8$ are each independently represent alkyl, hydroxyalkyl, alkenyl, or benzyl having one to eight carbon atoms, X represents a halogen atom such as F, Cl, Br, and I, and n represent an integer of 1 or greater.

Chemical Formula II

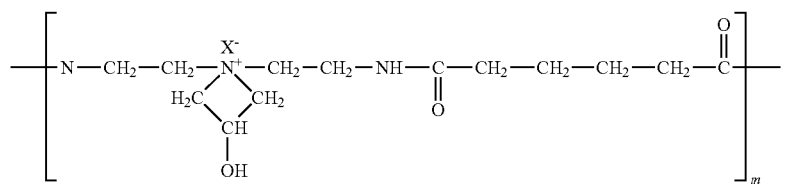

In Chemical Formula II, X represent a halogen atom such as F, Cl, Br, and I, and m represent an integer of 1 or greater. The both terminals of the copolymer represented by Chemical Formula II can be monomers constituting a repeating unit or known initiators.

Chemical Formula III

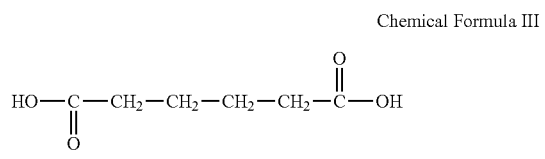

Chemical Formula IV

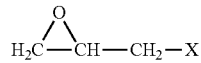

In Chemical Formula IV, X represents a halogen atom such as F, Cl, Br, and I.

The amine monomer mentioned above is not particularly limited and can be suitably selected to suit to a particular application. Specific examples include, but are not limited to, diethylenetriamine, triethylene tetraamine, tetraethylene pentaamine, iminobis propylamine. The monomer represented by the Chemical Formula V is preferable because it is industrially manufactured and readily procured.

$H_2N-CH_2-CH_2-NH-CH_2-CH_2-NH_2$    Chemical Formula V

The method of manufacturing a cationic polymer is not particularly limited and can be suitably selected to suit to a particular application. Specific examples include, but are not limited to, polymerizing an amine with a monomer containing epihalohydrin and graft-polymerizing a monomer containing epihalohydrin to a polyamide obtained by polymerizing a monomer containing an amine and a carboxylic acid.

A preferable weight average molecular weight of a cationic polymer depends on the type of a copolymer. The weight average molecular weight of a polyamine-epihalohydrin copolymer is preferably from 500 to 100,000. It is preferably from 5,000,000 or less in the case of polyamide-epihalohydrin copolymer or polyamidepolyamine-epihalohydrin copolymer. It is preferably from 700 to 50,000 in the case of amine-epihalohydrin copolymer. Each weight average molecular weight in the respective preferable upper limits mentioned above or less enhances water-solubility and the storage stability of a liquid composition. Each weight average molecular weight in the respective preferable lower limits mentioned above or greater enhances the anti-pathogen activity imparted to the region of a recording medium where a liquid composition has been applied.

The proportion of a cationic polymer to the entire liquid composition is preferably from 20 to 70 percent by mass and more preferably from 30 to 60 percent by mass. A proportion of the cationic polymer of 20 percent by mass or greater enhances the anti-pathogen activity imparted to the region of a recording medium where a liquid composition has been applied. A proportion of the cationic polymer of 70 percent by mass or less enhances the storage stability of a liquid composition.

As described above, a cationic polymer has a hydroxyl group and ammonium cation in the main chain and isolates a halogen anion in a liquid composition. When the liquid composition of the present disclosure is brought into contact with liquid like ink containing a particle having a negative charge such as a pigment, the particle agglomerates; in other words, the cationic polymer serves as a flocculant. When the liquid composition of the present disclosure contains a flocculant like a cationic polymer, the liquid composition is preferably used as a pre-processing fluid. The pre-processing fluid is applied to a recording medium before ink containing a pigment is applied to the recording medium. When ink is applied to a region where the pre-processing fluid is applied, some components such as a pigment in the ink agglomerate. This pre-processing fluid thus can minimize the occurrence of beading during image forming. Ink contains a coloring material such as a pigment, water, an organic solvent, a resin, a surfactant, and other substances. It can be manufactured from known materials. When the liquid composition of the present disclosure is used as pre-processing fluid, it is preferable that the liquid composition be substantially free of a coloring material such as a pigment. 'Substantially free of a coloring material' means that no coloring material is detected as is analyzed by a known method of a common general technical knowledge in an art.

Additive

The liquid composition optionally contains additives such as a surfactant, a corrosion inhibitor, and a pH regulator.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. In particular, silicone-based surfactants which do not decompose even at a high pH are preferable. Specific examples of the silicone-based surfactant include, but are not limited to, side-chain modified polydimethyl siloxane, both-terminal modified polydimethyl siloxane, one-terminal-modified polydimethyl siloxane, and side chain both-terminal modified polydimethyl siloxane. Silicone-based surfactants having a polyoxyethylene group or polyoxyethylene polyoxypropylene group as the modification group are particularly preferable because these demonstrate good properties as aqueous surfactants. The silicone-based surfactant includes a polyether-modified silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carbonic acid compounds include, but are not limited to, perfluoroalkyl carbonic acid and salts of perfluoroalkyl carbonic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application. Specific examples include, but are not limited to, side-chain-modified polydimethyl siloxane, both end-modified polydimethyl siloxane, one-end-modified polydimethyl siloxane, and side-chain-both-end-modified polydimethyl siloxane. In particular, a polyether-modified silicone-based surfactant having a polyoxyethylene group or a polyoxyethylene polyoxypropylene group is particularly preferable because such a surfactant demonstrates good property as an aqueous surfactant.

Such surfactants can be synthesized or procured. Products can be procured from BYK-Chemie GmbH, Shin-Etsu Silicone Co., Ltd., Dow Corning Toray Co., Ltd., NIHON EMULSION Co., Ltd., Kyoeisha Chemical Co., Ltd., and others.

The polyether-modified silicon-based surfactant has no particular limit and can be suitably selected to suit to a particular application. For example, a compound is usable in which the polyalkylene oxide structure represented by the following Chemical Formula S-1 is introduced into the side chain of the Si site of dimethyl polysiloxane.

Chemical Formula S-1

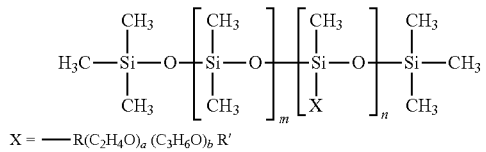

In Chemical Formula S-1, "m", "n". "a", and "b" each, respectively independently represent integers, R represents an alkylene group, and R' represents an alkyl group.

Specific examples of the polyether-modified silicone-based surfactant include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

A compound in which the number of carbon atoms replaced with fluorine atoms is from 2 to 16 is preferable and, from 4 to 16, more preferable, as the fluorochemical surfactant.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because these do not easily foam and the fluorochemical surfactant represented by the following Chemical Formula F-1 or Chemical Formula F-2 is preferable.

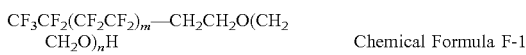

Chemical Formula F-1

In the compound represented by Chemical Formula F-1, "m" is preferably 0 or an integer of from 1 to 10 and "n" is preferably 0 or an integer of from 1 to 40.

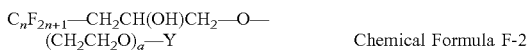

Chemical Formula F-2

In the compound represented by the Chemical Formula F-2, Y represents H or $C_mF_{2m+1}$, where n represents an integer of from 1 to 6, or $CH_2CH(OH)CH_2$—$C_mF_{2m+1}$, where m represents an integer of from 4 to 6, or $C_pH_{2p+1}$, where p is an integer of from 1 to 19. n represents an integer of from 1 to 6. a represents an integer of from 4 to 14.

The fluorochemical surfactant is commercially available. Specific examples include, but are not limited to, SURFLON 5-111, S-112, 5-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS. FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251. FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the entire liquid composition is not particularly limited and can be suitably selected to suit to a particular application. For example, the proportion is preferably from 0.001 to 5 percent by mass and more preferably from 0.05 to 5 percent by mass to achieve excellent wettability.

Corrosion Inhibitor

The corrosion inhibitor has no particular limitation. Specific examples include, but are not limited to, acid sulfites and sodium thiosulfates.

pH Regulator

Any pH regulator can be used. It includes lactic acid, succinic acid, gluconic acid, citric acid, and phosphoric acid.

Properties of Liquid Composition

Properties of the liquid composition are not particularly limited and can be suitably selected to suit to a particular application. For example, viscosity, surface tension, and pH are preferably in the following ranges.

Viscosity

The viscosity of the liquid composition at 25 degrees C. is preferably from 5 to 30 mPa·s and more preferably from 5 to 25 mPa s to achieve good applicability. Viscosity can be measured by equipment such as a rotatory viscometer (RE-80L, manufactured by TOKI SANGYO CO., LTD.). The measuring conditions are as follows:

Standard cone rotor (1° 34'×R24)
Sample liquid amount: 1.2 mL
Rate of rotations: 50 rotations per minute (rpm)
25 degrees C.
Measuring time: three minutes.

Surface Tension

The surface tension of a liquid composition is preferably 35 mN/m or less and more preferably 32 mN/m or less at 25 degrees C. because the liquid composition suitably levels on a recording medium and the liquid composition dries in a shorter time.

pH

The pH of the liquid composition is preferably from 5.0 to 7.0. A pH of 5.0 or greater prevents precipitation of the metal salt in a liquid composition, thereby minimizing the degradation of the storage stability of the liquid composition. A pH of 7.0 or less enhances the anti-pathogen activity imparted to the region of a recording medium where a liquid composition has been applied. The method of adjusting the pH of a liquid composition to a range of from 5.0 to 7.0 is not particularly limited. The pH can be readily adjusted by the cationic polymer mentioned above. The pH can be measured by a pH measuring method according to JIS Z8802 format.

Set of Ink and Processing Fluid

The set of a pre-processing fluid and ink of the present disclosure contains a pre-processing fluid containing the liquid composition of the present disclosure and an ink containing water, a pigment, and an organic solvent.

The ink contains water, a pigment, and an organic solvent and other optional additives.

Since the details of types and proportions of water, an organic solvent, and additives in the ink are the same as those of the liquid composition, their descriptions are omitted.

The pigment includes an inorganic pigment or organic pigment. These can be used alone or in combination. Also, mixed crystals are usable as the pigments.

Examples of the pigments include, but are not limited to, black pigments, yellow pigments, magenta pigments, cyan pigments, white pigments, green pigments, orange pigments, and gloss or metallic pigments of gold, silver, and others.

Carbon black manufactured by known methods such as contact methods, furnace methods, and thermal methods can be used as the inorganic pigment in addition to titanium oxide, iron oxide, calcium carbonate, barium sulfate, aluminum hydroxide, barium yellow, cadmium red, and chrome yellow.

Specific examples of the organic pigment include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of those pigments, pigments having good affinity with solvents are preferable. Hollow resin particles and hollow inorganic particles can also be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51, C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63, C.I. Pigment Green 1, 4, 7, 8, 10, 17, 18, and 36.

The proportion of the pigment of the ink is preferably from 0.1 to 15 percent by mass and more preferably from 1 to 10 percent by mass to enhance the image density and achieve good fixability and discharging stability.

Recording Medium

There is no specific limitation to the recording medium as long as it can be used for printing information such as text and images. It includes fiber products such as paper and cloth and non-fiber products such as plastic and metal.

The recording medium can be plain paper, coated paper, cloth, or film.

Unlike paper having an ink receptive layer on a substrate such as inkjet special paper, plain paper does not have an ink receptive layer. Specific examples of the procurable product include, but are not limited to, NBS Ricoh MyPaper, manufactured by Ricoh Co., Ltd. and OK Prince Quality Paper, manufactured by OJI PAPER CO., LTD.

Coated paper is composed of an original paper as a substrate and a layer formed by applying a coating material to the substrate for improving aesthetic appearance and smoothness of the paper. The coating material is, for example, a mixture of kaolin or calcium carbonate as white pigment and starch as binder. Specific examples of such coated paper include, but are not limited to, art paper, coated paper, light-weight coated paper, cast paper, inkjet special paper, and micro-coated paper. Specific examples of the procurable paper include, but are not limited to, RICOH BUSINESS COAT GLOSS 100 (manufactured by RICOH Co., Ltd.). OK TOP COAT+, OK KINFUJI+, and SA KINFUJI+(manufactured by Oji Paper Co., Ltd.), SUPER MI DUL, AURORA COAT, and SPACE DX (manufactured by Nippon Paper Industries Co., Ltd.), α matte and μ coat (manufactured by Hoketsu Paper Co., Ltd.), RAICHO ART and RAICHO SUPER ART (manufactured by Chuetsu Pulp & Paper Co., Ltd.), PEARL COAT N (manufactured by Mitsubishi Paper Mills Limited), and SWORD iJET (manufactured by MITSUBISHI PAPER MILLS LIMITED).

Recording Set

The liquid composition of the present disclosure can be used with a recording medium as a recording set. In other words, the recording set has a liquid composition of the present disclosure and a recording medium. The liquid composition and the recording medium of the recording set are independently present. The set is not limited to a case in which a liquid container containing a liquid composition and a recording medium are integrally manufactured or sold. Even if a liquid container containing a liquid composition and a recording medium are independently manufactured or sold, the set includes a case where using a liquid composition and a recording medium in combination is required or substantially invited.

Method of Applying Liquid and Device for Applying Liquid

The method of applying liquid includes applying the liquid composition mentioned above to a recording medium to impart antibacterial activity or antiviral activity to the recording medium. Specifically, the method executes, for example, applying the liquid composition to a recording medium, heating the recording medium where the liquid composition has been applied as first heating, applying ink to the region of the recording medium where the liquid composition has been applied, and heating the recording medium where the ink and the liquid composition have been applied as second heating. It is not necessary to execute both the first heating and the second heating. The heating in the present disclosure means at least one of the first heating and the second heating.

The device for applying liquid includes a liquid application device for applying the liquid composition mentioned above to a recording medium to impart antibacterial activity or antiviral activity to the recording medium. Specifically, the device for applying liquid includes, for example, a liquid application device for applying the liquid composition to a recording medium, a device for heating the recording medium where the liquid composition has been applied as a first heating device, a device for applying ink to the region of the recording medium where the liquid composition has been applied, and a device for heating the recording medium where the ink and the liquid composition have been applied as a second heating device. It is not necessary to deposit both the first heating device and the second heating device. The heating device in the present disclosure means at least one of the first heating device and the second heating device.

Liquid Applying and Device for Applying Liquid

In the liquid application, a liquid composition is applied to a recording medium. The amount of a liquid composition applied to a recording medium is preferably from 0.1 to 20 g/m$^2$ and more preferably from 0.5 to 10 g/m$^2$. An amount of a liquid composition of 0.1 g/m$^2$ or more enhances the anti-pathogen activity imparted to the region of a recording medium where the liquid composition has been applied. An amount of a liquid composition of 20 g/m$^2$ or less minimizes the degradation of the drying property in the heating, readily conveys a recording medium, and reduces the coloring of the recording medium.

The liquid application device for applying liquid applies a liquid composition to a recording medium. Specific examples of such devices include but are not limited, devices utilizing a blade coating method, gravure coating method, gravure offset coating method, a bar coating method, roll coating method, knife coating method, air knife coating method, comma coating method. U comma coating method, AKKU coating method, smoothing coating method, microgravure coating method, reverse roll coating method, four or five roll coating method, dip coating method, curtain coating method, slide coating method, and die coating method.

First Heating and First Heating Device

In the first heating, the recording medium on which a liquid composition has been applied is heated. The heat to a recording medium in the first heating prevents the liquid composition applied to the recording medium from being transferred to a conveyance member. The heating temperature in the first heating is preferably from 80 to 130 degrees C., more preferably from 90 to 130 degrees C. and furthermore preferably from 100 to 130 degrees C. A heating temperature of 80 degrees C. or higher shortens the time for drying and a heating temperature of 130 degrees C. or lower minimizes defectives such as wrinkle occurring to a recording medium. Since an organic preservative and fungicide is generally decomposed at a heating temperature of 80 degrees C. or higher, it is difficult to impart an antibacterial activity or antiviral activity to a recording medium as recorded matter obtained after printing. However, the liquid composition of the present disclosure can impart an antibacterial activity or an antiviral activity to recorded matter.

The first heating device heats a recording medium on which a liquid composition has been applied. The first heating device can utilize methods such as a heat drum method, an oven method, a heated wind blowing method, a pre-heating method, an electromagnetic heating method, and a heating roller method.

Ink Application and Device for Applying Ink

In the ink application, ink is applied to the region of a recording medium where the liquid composition has been applied. It is preferable to apply ink after the first heating. The ink application is preferably discharging ink and more preferably inkjetting ink.

The device for applying ink applies ink to the region of a recording medium where the liquid composition has been applied. The device for applying ink is preferably a device for discharging ink and more preferably a device for inkjetting ink. The device for inkjetting ink is an inkjet head, which is classified into a line head and a scanning head. The method of driving an inkjet head is not particularly limited. Inkjet heads can be driven by a piezoelectric element actuator utilizing lead zirconate titanate (PZT), a method utilizing thermal energy, an actuator utilizing electrostatic force, and a continuous jetting method for charge-control.

Second Heating and Second Heating Device

In the second heating, the recording medium on which a liquid composition and ink have been applied is heated. The heat to a recording medium in the second heating prevents the liquid composition and the ink applied to the recording medium from being transferred to a conveyance member. The heating temperature in the second heating is preferably from 80 to 130 degrees C. more preferably from 90 to 130 degrees C., and furthermore preferably from 100 to 130 degrees C. A heating temperature of 80 degrees C. or higher shortens the time for drying and a heating temperature of 130 degrees C. or lower minimizes defectives such as wrinkle occurring to a recording medium. Since an organic preservative and fungicide is generally decomposed at a heating temperature of 80 degrees C. or higher, it is difficult to impart an antibacterial activity or antiviral activity to a recording medium as recorded matter obtained after printing. However, the liquid composition of the present disclosure can impart an antibacterial activity or an antiviral activity to recorded matter.

The second heating device heats a recording medium on which a liquid composition has been applied. The second heating device can utilize methods such as heat drum method, an oven method, a heated wind blowing method, a pre-heating method, an electromagnetic heating method, and a heating roller method.

Configuration of Device for Applying Liquid

The device for applying liquid is described using an example with reference to the drawing. The drawing is a diagram illustrating a device for applying a liquid composition and ink to a continuous recording medium.

As illustrated in the drawing, the device for applying liquid includes a conveyance path 108 for conveying a recording medium 101, a liquid application device 102 for applying a liquid composition to the recording medium 101, a conveyance device 103 for conveying the recording medium 101, a first heating device 104 for heating the recording medium 101 where the liquid composition has been applied, an ink application device 105 for applying ink to the recording medium 101 after the first heating, and a second heating device 106 for heating the recording medium 101 where the liquid composition and the ink have been applied. It manufactures recorded matter 107 obtained by printing onto the recording medium 101.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Example of Synthesis of Cationic Polymer

A total of 95.1 g of water and 131.8 g (0.8 mol) of an aqueous solution of trimethyl amine hydrochloric acid salt at 58 percent were charged in a 500 ml four-necked flask equipped with a stirrer, a thermometer, a reflux condenser, and a nitrogen introducing tube. Next, 74.0 g (0.8 mol) of epichlorohydrine was added dropwise to the flask in three hours while being cooled down in a nitrogen gas atmosphere not to surpass 40 degrees C. Thereafter, the resulting mixture was heated to 80 degrees C. and allowed to react in one hour. Subsequent to being cooled down to 30 degrees C., 36.1 g (0.4 mol) of an aqueous solution of dimethyl amine at 50 percent and 14.8 g (0.2 mol) of calcium hydroxide were added and the resulting mixture was heated to 80 degrees C. and allowed to react in one hour. Thereafter, the reaction liquid was adjusted by hydrochloric acid and water to achieve a pH of 4.0 and a concentration of solid content of 50 percent by mass, thereby obtaining a cationic polymer in a form of a polymer liquid dispersion.

Preparation of Liquid Composition

Examples 1 to 10 and Comparative Examples 1 to 6

The formulations shown in Tables 1 and 2 were mixed and stirred for one hour and thereafter filtered with a polyvinylidene fluoride membrane filter having an average hole diameter of 5.0 μm under pressure to remove undissolved matter. Each liquid composition of Examples 1 to 10 and Comparative Examples 1 to 6 was thus prepared. The values shown in Tables 1 and 2 are represented in percent by mass. The contents of the cationic polymer shown in Tables 1 and 2 represent the solid contents. The pH was from 5.0 to 7.0 in Examples 1 to and Comparative Examples 1 to 3 and 6. The pH is less than 5.0 in Comparative Example 4 and the pH surpasses 7.0 in Comparative Example 5.

The following materials were used for each component in Tables 1 and 2 below.

Surfactant
  EMULGEN LS-106, manufactured by Kao Corporation
Macrocyclic Compound
  18-crown-6-ether: Molecular weight of 264, manufactured by Tokyo Chemical Industry Co. Ltd.
  Dibenzo-18-crown-6-ether: Molecular weight of 360, manufactured by Tokyo Kasei Kogyo Co., Ltd.
  Diaza-18-crown-6-ether: Molecular weight of 262, manufactured by Tokyo Chemical Industry Co. Ltd.
  [2, 2, 2] criptand: Molecular weight of 376 manufactured by Sigma-Aldrich Co. LLC.
  [3, 3, 2] criptand: Molecular weight of 465 manufactured by Sigma-Aldrich Co. LLC.

TABLE 1

| | | Example 1 | Example 2 | Example 3 | Example 4 | Example 5 |
|---|---|---|---|---|---|---|
| Organic solvent | 3-methyl-1,3-butane diol | 10.0 | 10.0 | 10.0 | 10.0 | 10.0 |
| | 2-ethyl-1,3-hexane diol | 2.0 | 2.0 | 2.0 | 2.0 | 2.0 |
| Metal salt | $CaCl_2$ | | | | | |
| | $MgSO_4$ | | | | | |
| | $AlCl_3$ | | | | | |
| | $CuCl_2$ | 2.40 | | | | |
| | $AgNO_3$ | | 3.40 | 3.40 | 3.40 | 3.40 |
| | Cationic polymer | | 45.0 | 45.0 | 45.0 | 45.0 |
| Macrocyclic compound | 18-crown-6-ether | 5.28 | 5.28 | | | |
| | Dibenzo-18-crown-6-ether | | | 7.20 | | |
| | Diaza-18-crown-6-ether | | | | 5.24 | |
| | [2.2.2] cryptand | | | | | |
| | [3.3.2] cryptand | | | | | 7.52 |
| Surfactant | EMULGEN LS-106 | 0.005 | 0.005 | 0.005 | 0.005 | 0.005 |
| Corrosion Inhibitor | Sodium thiosulfate | 0.005 | 0.005 | 0.005 | 0.005 | 0.005 |
| pH regulator | Phosphoric acid | 0.75 | 0.77 | 0.77 | 0.77 | 0.77 |
| Water | Pure water | Balance | Balance | Balance | Balance | Balance |
| | Total (percent by mass) | 100 | 100 | 100 | 100 | 100 |

| | | Example 6 | Example 7 | Example 8 | Example 9 | Example 10 |
|---|---|---|---|---|---|---|
| Organic solvent | 3-methyl-1,3-butane diol | 10.0 | 10.0 | 10.0 | 10.0 | 10.0 |
| | 2-ethyl-1,3-hexane diol | 2.0 | 2.0 | 2.0 | 2.0 | 2.0 |
| Metal salt | $CaCl_2$ | | 2.22 | | | |
| | $MgSO_4$ | | | 2.40 | | |
| | $AlCl_3$ | | | | 2.66 | |
| | $CuCl_2$ | | | | | 2.68 |
| | $AgNO_3$ | 3.40 | | | | |
| | Cationic polymer | 45.0 | 45.0 | 45.0 | 45.0 | 45.0 |
| Macrocyclic compound | 18-crown-6-ether | | 5.28 | 5.28 | 5.28 | 5.28 |
| | Dibenzo-18-crown-6-ether | | | | | |
| | Diaza-18-crown-6-ether | | | | | |
| | [2.2.2] cryptand | | | | | |
| | [3.3.2] cryptand | 9.28 | | | | |
| Surfactant | EMULGEN LS-106 | 0.005 | 0.005 | 0.005 | 0.005 | 0.005 |
| Corrosion Inhibitor | Sodium thiosulfate | 0.005 | 0.005 | 0.005 | 0.005 | 0.005 |
| pH regulator | Phosphoric acid | 0.77 | 0.20 | 0.10 | 0.66 | 0.75 |
| Water | Pure water | Balance | Balance | Balance | Balance | Balance |
| | Total (percent by mass) | 100 | 100 | 100 | 100 | 100 |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| Organic solvent | 3-methyl-1,3-butane diol | 10.0 | 10.0 | 10.0 | 10.0 | 10.0 | 10.0 |
| | 2-ethyl-l,3-hexane diol | 2.0 | 2.0 | 2.0 | 2.0 | 2.0 | 2.0 |
| Metal salt | $CaCl_2$ | | | | | | |
| | $MgSO_4$ | | | | | | |
| | $AlCl_3$ | | | | | | |
| | $CuCl_2$ | 2.68 | 2.40 | | | | |
| | $AgNO_3$ | | | | 3.40 | 3.40 | |
| | Cationic polymer | | 45.0 | | | | 45.0 |

TABLE 2-continued

|  |  | Comparative Example | | | | | |
|---|---|---|---|---|---|---|---|
|  |  | 1 | 2 | 3 | 4 | 5 | 6 |
| Macrocyclic compound | 18-crown-6-ether | | | | | | |
|  | Dibenzo-18-crown-6-ether | | | | | | |
|  | Diaza-18-crown-6-ether | | | | | | |
|  | [2.2.2] cryptand | | | | | | |
|  | [3.3.2] cryptand | | | | | | |
| Surfactant | EMULGEN LS-106 | 0.005 | 0.005 | 0.005 | 0.005 | 0.005 | 0.005 |
| Corrosion Inhibitor | Sodium thiosulfate | 0.005 | 0.005 | 0.005 | 0.005 | 0.005 | 0.005 |
| PH regulator | Phosphoric acid | 0.75 | 0.75 | 0.05 | 2.80 |  | 0.05 |
| Water | Pure water | Balance | Balance | Balance | Balance | Balance | Balance |
|  | Total (percent by mass) | 100 | 100 | 100 | 100 | 100 | 100 |

Anti-pathogen activity, beading, storage stability, and coloring properties of the liquid compositions obtained were evaluated in the following manner. The results are shown in Table 3. First, recorded matter A where a liquid composition was applied and recorded matter B where no liquid composition was applied were prepared in the following manner to evaluate the anti-pathogen activity of the liquid compositions. The recorded matter A where a liquid composition was applied was prepared in the following manner to evaluate the beading of the liquid compositions.

Preparation of Recorded Matter a where Liquid Composition was Applied

An inkjet printing system, RICOH Pro VC 60000, manufactured by Ricoh Co., Ltd., was filled with a liquid composition as pre-processing fluid and cyan ink for the inkjet printing system. A recording medium, roll paper of Lumiart Gloss having a weight of 130 g/m² and a width of 521 mm, manufactured by Stora Enso AB, was placed in the inkjet printing system. The liquid composition was applied to the recording medium. The recording medium was thereafter heated for drying at 100 degrees C. The cyan ink was thereafter applied to the recording medium followed by heating and drying the recording medium where the liquid composition and the ink were applied to obtain recorded matter A where a cyan solid image was printed. The amount of the liquid composition applied was 40 mg/A4. The ink was applied to the region of the recording medium where the liquid composition was applied. The recording resolution was 1,200 dpi×1,200 dpi.

Preparation of Recorded Matter B where No Liquid Composition was Applied

An inkjet printing system, RICOH Pro VC 60000, manufactured by Ricoh Co., Ltd., was filled with cyan ink for the inkjet printing system. A recording medium, roll paper of Lumiart Gloss having a weight of 130 g/m² and a width of 521 mm, manufactured by Stora Enso AB, was placed in the inkjet printing system. The cyan ink was applied to the recording medium followed by heating and drying the recording medium at 100 degrees C. where the ink was applied to obtain recorded matter B where a cyan solid image was printed. The ink had a recording resolution of 1,200 dpi×1,200 dpi.

Evaluation on Anti-Pathogen Activity

The anti-pathogen activity was evaluated using the recorded matter A and the recorded matter B in the following manner. A total of 1 mL of defrosted freeze-dried *Staphylococcus aureus* was placed in 9 ml of nutrient broth followed by centrifugal. After removing the supernatant, the resulting matter was suspended in 10 mL of a fresh nutrient broth. This suspension was subjected to shaking culture at 130 rpm at 37 degrees C. for one and half hours. The suspension after the shaking culture was diluted with sterile distilled water to achieve a concentration of $10^6$ cfu/g to prepare a bacterial liquid. Next, the bacterial liquid was added dropwise at a concentration of 0.1 mL/cm² to the solid image of the recorded matter A and the recorded matter B cut to a size of 3 cm×3 cm to obtain samples. The samples were placed in a hemathermal container at 37 degrees C. Twenty four hours later, the samples were continuously diluted with an inert diluent. The diluted samples were applied to SCDLP agar medium (manufactured by Nihon pharmaceutical Co., Ltd.). After culturing at 37 degrees C. for three days, the number of colonies were counted to obtain the number of bacteria. The antibacterial activity was evaluated according to the following evaluation criteria. Grade 5 or higher is preferable.

Evaluation Criteria

10: No live bacteria were detected on recorded matter A, demonstrating an extremely high level of antibacterial activity 9: Number of bacteria on recorded matter A was less than one thousandth of that on recorded matter B 8: Number of bacteria on recorded matter A was from one thousandth to less than one hundredth of that on recorded matter B 7: Number of bacteria on recorded matter A was from one hundredth to less than one tenth of that on recorded matter B 6: Number of bacteria on recorded matter A was from one tenth to less than one fifth of that on recorded matter B 5: Number of bacteria on recorded matter A was from one fifth to less than a half of that on recorded matter B 4: Number of bacteria on recorded matter A was from a half to less than two thirds of that on recorded matter B 3: Number of bacteria on recorded matter A was from two thirds to less than three fourths of that on recorded matter B 2: Number of bacteria on recorded matter A was from three fourths to less than four fifths of that on recorded matter B 1: Number of bacteria on recorded matter A was four fifths or greater of that on recorded matter B Evaluation on Beading The recorded matter A was visually checked to evaluate the beading based on the following evaluation criteria. Grade E or higher is preferable.

Evaluation Criteria
- A: Non-uniformity was not visible and the solid portion was even
- B: Non-uniformity was visible but difficult to visually recognize
- C: Non-uniformity was visible but not noticeable
- D: Non-uniformity was visible and slightly noticeable
- E: Non-uniformity was visible and fine unevenness recognizable
- F: Non-uniformity was visible and middle level unevenness recognizable
- G: Non-uniformity was visible and great level unevenness recognizable Evaluation on Storage Stability A 100 ml polyethylene bin was filled with 50 ml of a liquid composition and heated in a thermostatic chamber at 35 degrees C. The temperature was changed to 25 degrees C. after 120 hours. Twenty four hours later, the bin was removed from the thermostatic chamber and visually checked for precipitation. 'Good' means that precipitation is not present.

Evaluation on Coloring Property

The color of the liquid compositions obtained was visually checked.

TABLE 3

|  |  | Evaluation result | | | |
|---|---|---|---|---|---|
|  |  | Anti-pathogen activity | Beading | Storage Stability | Coloring property |
| Example | 1 | 6 | E | Good | Very pale blue |
|  | 2 | 10 | B | Good | Clear |
|  | 3 | 10 | B | Good | Clear |
|  | 4 | 10 | B | Good | Clear |
|  | 5 | 10 | B | Good | Clear |
|  | 6 | 10 | B | Good | Clear |
|  | 7 | 5 | B | Good | Clear |
|  | 8 | 5 | B | Good | Clear |
|  | 9 | 5 | A | Good | Clear |
|  | 10 | 6 | B | Good | Very pale blue |
| Comparative Example | 1 | 6 | E | Good | Blue |
|  | 2 | 8 | C | Good | Blue |
|  | 3 | 1 | G | Good | Clear |
|  | 4 | 7 | F | Precipitated | Clear |
|  | 5 | 4 | F | Precipitated | Clear |
|  | 6 | 3 | D | Good | Clear |

The antibacterial activity values of the liquid compositions of Examples 2 to 6 were all 1.0 or greater as measured according to JIS L 1902:2015 format regulating the antibacterial activity of fiber products. The recorded matter A was used as antibacterial treated test piece and the recorded B was used as non-antibacterial treated test piece in the JIS L 1902:2015 test.

The antiviral activity values of the liquid compositions of Examples 2 to 6 were all 1.0 or greater as measured according to JIS L 1922 format regulating the antiviral activity of fiber products. The recorded matter A was used as antiviral treated test piece and the recorded B was used as non-antiviral treated test piece in the JIS L 1922 test.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid composition comprising:
   a macrocyclic compound enclosing a metal ion;
   water;
   an organic solvent; and
   a cationic polymer having a main chain comprising a cationic ammonium group,
   wherein a recording medium where the liquid composition has been applied has at least one of an antibacterial activity or an antiviral activity.

2. The liquid composition according to claim 1,
   wherein the liquid composition has a pH of from 5.0 to 7.0.

3. The liquid composition according to claim 1,
   wherein the metal ion comprises silver ion.

4. The liquid composition according to claim 1,
   wherein the macrocyclic compound has a molecular weight of from 250 to 500.

5. The liquid composition according to claim 1,
   wherein the antibacterial activity has an antibacterial activity value of 1.0 or greater in evaluation based on a method according to JIS L 1902:2015 format or JIS Z 2801:2012 format,
   wherein the antiviral activity has an antiviral activity value of 1.0 or greater in evaluation based on a method according to JIS L 1922:2016 format or ISO 21702:2019 regulation.

6. A method of applying liquid comprising: applying a liquid composition to a recording medium to impart at least one of an antibacterial activity or antiviral activity to the recording medium, wherein the liquid composition comprises: a macrocyclic compound enclosing a metal ion; water; an organic solvent; and a cationic polymer having a main chain comprising a cationic ammonium group.

7. The method according to claim 6,
   further comprising heating the recording medium at 80 degrees C. or higher where the liquid composition is applied.

8. The method according to claim 6,
   further comprising discharging ink comprising a pigment to a region of the recording medium where the liquid composition is applied.

9. A device for applying liquid comprising: a liquid container containing a liquid composition comprising: a macrocyclic compound enclosing a metal ion; water; an organic solvent; and a cationic polymer having a main chain comprising a cationic ammonium group; and a liquid application device configured to apply the liquid composition to a recording medium to impart at least one of an antibacterial activity or an antiviral activity to the recording medium.

10. A pre-processing fluid comprising:
    the liquid composition of claim 1; and
    a flocculant,
    wherein a recording medium where the liquid composition has been applied has at least one of an antibacterial activity or an antiviral activity.

11. A set comprising:
    a preprocessing fluid comprising the liquid composition of claim 1; and
    an ink comprising water, a pigment, and an organic solvent.

12. The liquid composition according to claim 1, wherein a proportion of the cationic polymer to a total amount of the liquid composition is from 20% to 70% by mass.

13. The liquid composition according to claim 1, wherein the cationic polymer is a cationic polymer obtained by polymerizing an amine and a monomer containing epihalohydrin.

14. The liquid composition according to claim 1, wherein the cationic polymer is a cationic polymer of Chemical Formula I; a cationic polymer of Chemical Formula II; a cationic polymer obtained by polymerizing an amine monomer, a monomer of Chemical Formula III, and a monomer of Chemical Formula IV; or any combination thereof:

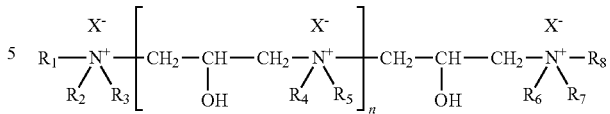

Chemical Formula I

Chemical Formula I
wherein $R_1$ to $R_8$ are each independently alkyl, hydroxyalkyl, alkenyl, or benzyl having one to eight carbon atoms, wherein X is a halogen atom, and wherein n is an integer of 1 or greater;

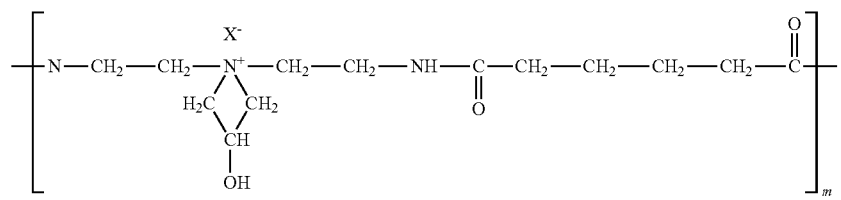

Chemical Formula II wherein X is a halogen atom, and wherein m is an integer of 1 or greater;

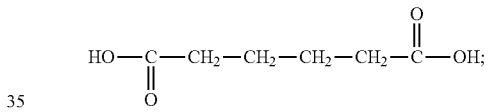

Chemical Formula III

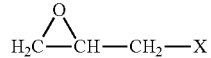

Chemical Formula IV wherein X is a halogen atom.

15. The liquid composition according to claim 1, wherein the cationic polymer has a weight average molecular weight of from 500 to 100,000.

* * * * *